Patented June 19, 1945

2,378,714

UNITED STATES PATENT OFFICE 2,378,714

FIREPROOFING COMPOSITIONS

Martin Leatherman, Hyattsville, Md.

No Drawing. Application May 28, 1942,
Serial No. 444,919

8 Claims. (Cl. 106—15)

(Granted under the act of March 3, 1883, as
amended April 30, 1928; 370 O. G. 757)

The invention described herein may be manufactured and used by or for the Government for governmental purposes without payment to me of any royalty thereon.

This invention relates to fireproofing compositions, and more particularly to compositions capable of imparting fire and flameproofing properties to fibrous materials such as those having a cellulose or protein base, and of either natural or synthetic origin. It has application either to the coating or painting of materials such as wood, or to the impregnation or coating of fibrous materials.

In my Patent Number 2,326,233, dated August 10, 1943, I have disclosed and claimed a fireproofing composition in which chlorinated organic materials are combined with zinc carbonate and suitable solvents, pigments and wetters to impart fireproofing qualities to fibrous materials and the like. That invention is predicated upon the ability of chlorinated organic materials to evolve hydrogen chloride at temperatures well below 300° C., and also upon the ability of the zinc carbonate to evolve carbon dioxide at temperatures of 300° C. and above. Consequently, that combination is extremely effective as a fireproofing agent, particularly when applied to fabrics, because of its ability to evolve fire extinguishing gases such as hydrogen chloride and carbon dioxide at temperatures considerably below the ignition temperature of most fabrics and to continue that evolution at higher temperatures.

The effectiveness of the above composition as a fireproofing agent is due in large measure to the large volume of hydrogen chloride which is liberated by highly chlorinated organic materials, and requires such materials to have a chlorine content amounting to about 50 to 60 percent of the weight of the organic material. Chlorinated compounds of the character stated are no longer available because production of chlorinated materials having a chlorine content of more than 46 percent of the weight of the material has been prohibited as a war measure.

I have found that fireproofing compositions of the character disclosed in the above mentioned application can be rendered fully effective using smaller amounts of zinc carbonate than those stated in the above application, and using chlorinated organic material such as chlorinated paraffin in which the chlorine content is less than about 46%, by adding to the composition a little known compound which is variously designated as a hydrated double salt of calcium chloride and monocalcium phosphate

as a hydrated double salt of dicalcium phosphate and hydrochloric acid ($CaHPO_4 \cdot HCl \cdot H_2O$), or as monocalcium chlorophosphate

This compound is thermally stable at temperatures up to 125° C. but at temperatures in excess of 150° C. it decomposes and evolves hydrogen chloride. It is a compound which is easily made from materials of which there is no wartime shortage. It may, for example, be made either from acid-digested bone and phosphoric acid, or from calcium chloride and phosphoric acid. In effect, this material, which will be referred to hereafter as monocalcium chlorophosphate, serves to replace a portion of both the chlorinated organic material and the zinc carbonate of the above patent. In this role, the monocalcium chlorophosphate functions by reducing the proportions or amounts of all of the ingredients except the inert pigment, and liberates hydrogen chloride to make up for the reduction in evolution of that gas in lightly chlorinated material.

It makes it possible to achieve fully satisfactory results from available materials while also bringing about marked economy in the use of the chlorinated materials and the zinc carbonate. This is true because it requires only about 1 part by weight of zinc carbonate to react with 3 parts of monocalcium chlorophosphate and because the rate and amount of hydrogen chloride evolution from chlorinated paraffins and other chlorinated organic materials of low chlorine content is disproportionately less than the chlorine percentage figures would indicate. Wide latitude may be exercised in the amount of the chlorophosphate which is used, but in general it is preferred not to use a smaller proportion of chlorophosphate than is represented by the ratio of one mole of zinc carbonate to two moles of monocalcium chlorophosphate. For example, a very effective ratio is one part of zinc carbonate by weight to 3 parts of chlorinated organic material and monocalcium chlorophosphate combined.

The economy effected by the use of the chlorophosphate is well illustrated by the fact that in the composition of the above application where no chlorophosphate is employed the most effective proportions of zinc carbonate and highly chlorinated organic material approach 1 part of zinc carbonate to 2 parts of chlorinated organic material. Therefore, the present invention makes it possible not only to substitute a portion of much cheaper material for the zinc carbonate, but also restores the effectiveness of compositions made according to the disclosure of the above patent, using organic materials of lower chlorine content than have heretofore been desirable from the standpoint of effective flameproofing action.

While the present invention is concerned largely in rendering a less highly chlorinated organic material effective, it will be obvious that the monocalcium chlorophosphate may be employed to advantage as an extender to replace a part of the more costly ingredients when highly chlorinated organic material, that is, one having a chlorine content of 50 to 60 percent, or more, is used.

While the present composition is effective without the use of pigments, it will ordinarily be found desirable, especially in treating fabrics, to add inert pigments, preferably earth colors such as sienna, umber, ochre and the like, iron oxides, carbon black, metallic particles and metallic oxides or other metallic pigments. The pigments serve to protect the chlorinated organic material from the decomposing effect of actinic light as well as to give decorative effects.

When the composition is used for the impregnation of fibrous material, it is necessary in order to secure proper distribution of the ingredients to employ materials known in the art as pigment wetters. Among these wetters may be mentioned aluminum stearate, zinc naphthenate, cadmium naphthenate, heat bodied linseed oil and fatty acids. Numerous other wetters known in the art may also be used, and in most cases those materials will amount to approximately 4% of the solids present in the composition, although as much as 10% may be used in some cases.

A necessary ingredient of the composition is a plasticizer having fireproofing qualities. One material which is particularly effective for this purpose and is preferred, is tricresyl phosphate. Other materials which might be used in its stead are triphenyl phosphate, chlorinated diphenyl and similar compounds which combine the functions of a plasticizer and a fire retardant. The two functions of the material must be combined, as a material having plasticizing functions alone is not suitable for the achievement of best results.

The following are examples of compositions which are effective for accomplishing the purposes of the present invention:

*Example I*

|   | Percent |
|---|---|
| Monocalcium chlorophosphate | 17.0 |
| Zinc carbonate | 6.4 |
| Inert opaque pigments such as iron oxide, lampblack, lead chromate, chromium oxide, ochre, etc | 27.7 |
| Aluminum stearate | 2.1 |
| Chlorinated paraffin | 42.5 |
| Tricresyl phosphate | 4.3 |
| Mineral spirits as required for grinding and dilution. | |
|   | 100.0 |

*Example II*

|   | Percent |
|---|---|
| Monocalcium chlorophosphate | 22.4 |
| Zinc carbonate | 15.5 |
| Inert pigment | 26.9 |
| Chlorinated paraffin | 29.1 |
| Zinc naphthenate | 2.7 |
| Tricresyl phosphate | 3.4 |
| Mineral spirits as required for grinding and dilution. | |
|   | 100.0 |

*Example III*

|   | Percent |
|---|---|
| Monocalcium chlorophosphate | 13.5 |
| Zinc carbonate | 13.5 |
| Inert pigment | 26.0 |
| Chlorinated paraffin | 25.3 |
| Heat bodied linseed oil or tung oil | 13.5 |
| Tricresyl phosphate | 8.2 |
| Mineral spirits as required for grinding and dilution. | |
|   | 100.0 |

(In this formula half of the drying oil may be replaced by a non-drying oil, such as cottonseed oil.)

The above examples given, with the percentages on a solvent-free basis, are fully satisfactory for carrying out the purpose of the invention. It is possible to vary the percentages from those given while still retaining the important advantages that are set forth in the specification. In general it may be said that the composition is effective when the ingredients are present in approximately the following percentages on a solvent-free basis:

|   | Percent |
|---|---|
| Zinc carbonate | 5–20 |
| Monocalcium chlorophosphate | 12–25 |
| Inert pigment | 22–30 |
| Chlorinated organic material | 20–45 |
| Wetting agent | 2– 4 |
| Fireproofing plasticizer | 3– 8 |

Compositions such as are indicated in the above examples have been found to produce satisfactory fireproofing properties using chlorinated paraffin containing less than 46 percent chlorine, provided, however, that the impregnated combustible materials contained approximately one half their weight of the fireproofing composition, after evaporation of the solvent. Obviously, if more highly chlorinated paraffin is substituted for the low chlorine content paraffin, appreciably less quantities of the fireproofing composition will be required to accomplish a given result. For instance, with chlorinated paraffin containing approximately 60 percent chlorine, the same degree of fire resistance can be obtained with approximately 35 parts of the solvent-free composition to 100 parts of combustible fibrous material that formerly required at least 50 parts of composition to 100 parts of fibrous material.

The amount of take-on will depend upon the weight of the fibrous material and a light material will require a greater percentage of the compound than a heavier one. The examples given above are typical for the treatment of 12 ounce duck.

Although chlorinated paraffin produced by chlorinating paraffin wax melting at 51° C. to 58° C. is most desirable for purposes of the present invention, because of its low cost, there may be admixed with it or in any desired mixture or singly any thermally unstable chlorinated organic material such as the resinous materials polyvinyl chloride, vinyl chloride-vinyl acetate copolymers, and polymerized chlorinated paracymene, as well as chlorinated vegetable oils, chlorinated mixtures of paraffin wax and paraffin base petroleum oil and the like.

The term "resinous" as employed herein is intended to include all of the classes of materials just enumerated where the materials have physical properties that are resin-like in character at congealing temperatures.

The functioning of the composition as a fire retardant is approximately as follows when a combustible cellulose base fabric is impregnated with it. When the material is heated to a temperature of about 150° C. the chlorophosphate begins to decompose with the evolution of hydrogen chloride which acts as a fireproofing or flame extinguishing agent. Also at temperatures of 150° C. to 300° C. and even above 300° C., the chlorinated organic material liberates hydrogen chloride gas in copious quantities. At 300° C. the zinc carbonate decomposes, liberating carbon dioxide and this carbon dioxide also functions as a fire extinguisher. At the same time, any gases liberated from the material which would ordinarily be combustible become mixed with the carbon dioxide and the hydrogen chloride and are, therefore, unable to burn or ignite.

The hydrogen chloride is liberated from the chlorophosphate and from the chlorinated material at much lower temperatures than that at which carbon dioxide is liberated from zinc carbonate by the action of heat alone, the latter occurring around 300° C., which is the ignition temperature of many fibrous materials, especially those of cellulosic natures. However, the hydrogen chloride gas reacts with the zinc carbonate at temperatures below 300° C. so as to liberate carbon dioxide and form zinc chloride and water. Consequently, there is a liberation of hydrogen chloride in two stages and then liberation of carbon dioxide before the ignition temperature of the fabric is reached. As the temperature reaches 300° C. or above, there is evolution of carbon dioxide gas with the formation of zinc oxide.

Where the material which has been treated is of a cellulose composition, the zinc oxide acts as a dehydration catalyst, whereby the heat causes the cellulose to separate into carbon and water so as to prevent the liberation of combustible gases.

The effects of all these ingredients are therefore cumulative and extremely effective not only in preventing ignition and flaming, but also in extinguishing flame and preventing its propagation. The effects begin at temperatures well below the ignition temperatures of most fabrics, and continue even above those temperatures, thus serving not only to prevent ignition and to extinguish flame but also to prevent destruction by glowing and smoldering.

It is obvious that suitable fillers and fungicides may be added to the composition if desired. Fillers may act as siccative agents and to increase the opacity of the composition. Suitable fillers are clay, bentonite, barytes and the like. While the zinc carbonate acts as a fungicide and tends to prevent mildewing of the material, its effect may be strengthened by the addition of other fungicides such as cadmium stearate, pentachlorphenol, cadmium pentachlorphenate, zinc and cadmium naphthenate, copper naphthenate, cadmium carbonate, cadmium oxide, copper carbonate, copper oxide, lead pentachlorphenate, and the like.

The preferred manner of preparation of my compositions is to grind the ingredients, suitably thinned as by mineral spirits, on a roller mill of the type used in preparing paints. It may then be applied to the material to be treated by brushing, spraying or dipping. In applying the composition to fabrics or other fibrous materials, the thinner is adjusted to give the desired residue of composition in the fibrous material after drying. The amount of thinner required will vary according to the method used for applying the composition to the fibrous materials. A preferred method is to immerse the fibrous material, and to squeeze it heavily in a padding machine and then to dry it on steam heated rolls. The compositions may also be brushed or sprayed on, when used as fire retardant paints for wood and other surfaces.

While it is indicated above that the ingredients are dissolved in a volatile dispersion medium such as mineral spirits, it is also practicable to disperse the materials in water in order to avoid the use of flammable dispersion media. Consequently, in this specification, the term "dispersion medium" is used generically to cover any liquid medium which serves either to dissolve or to suspend the solids used in the composition.

It will be clear that compositions of the character described above result in imparting to the material treated not only excellent fireproofing and flameproofing characteristics, but will also achieve marked economy by reducing the amount of expensive and scarce materials such as highly chlorinated organic materials and zinc carbonate required, without in any way disadvantageously affecting the results.

I claim:

1. A fireproofing composition comprising a mixture of thermally unstable chlorinated resinous organic material, zinc carbonate, monocalcium chlorophosphate, a wetting agent for the solid ingredients, a dispersion medium, and a plasticizer having fire retarding properties.

2. The composition of claim 1 in which the plasticizer is tricresyl phosphate.

3. The composition of claim 1 in which the plasticizer is triphenyl phosphate.

4. The composition of claim 1 in which the plasticizer is chlorinated diphenyl.

5. A fireproofing composition comprising chlorinated paraffin having a chlorine content of approximately 46 percent by weight of the paraffin, zinc carbonate, monocalcium chlorophosphate, a wetting agent for the solid ingredients, a dispersion medium, and a plasticizer from the class consisting of tricresyl phosphate, chlorinated diphenyl and triphenyl phosphate.

6. A fireproofing composition having approximately the following percentage of ingredients on a solvent-free basis:

| | Percent |
|---|---|
| Zinc carbonate | 5–20 |
| Monocalcium chlorophosphate | 12–25 |
| Inert pigment | 22–30 |
| Thermally unstable chlorinated resinous organic material | 20–45 |
| Wetting agent | 2–4 |
| Fireproofing plasticizer | 3–8 |

7. A fireproofing composition capable of continuously evolving flame extinguishing gases over a temperature range from about 150° C. to at least 300° C., said composition comprising a thermally unstable chlorinated resinous organic material, zinc carbonate, monocalcium chlorophosphate, a wetting agent for the solid ingredients, a dispersion medium, and a plasticizer having fireproofing characteristics, said plasticizer being from the class consisting of tricresyl phosphate, chlorinated diphenyl and triphenyl phosphate.

8. A fireproofing composition capable of continuously evolving flame extinguishing gases over a temperature range of at least 150 centigrade degrees, said composition comprising chlorinated paraffin having a chlorine content of approximately 46 percent by weight of the paraffin, zinc carbonate, monocalcium chlorophosphate, a wetting agent for the solid ingredients, a dispersion medium, and a plasticizer having fire retarding properties.

MARTIN LEATHERMAN.